(12) United States Patent
Prufer et al.

(10) Patent No.: US 6,779,327 B2
(45) Date of Patent: Aug. 24, 2004

(54) SYSTEM FOR HARVESTING SEED FROM A CONIFEROUS TREE

(76) Inventors: Fred Prufer, P.O. Box 1919, Whitecourt, Alberta (CA), T7S 1P6; Erik Bergvinson, P.O. Box 2067, Whitecourt, Alberta (CA), T7S 1P7

( * ) Notice: Subject to any disclaimer, the term of this patent is extended or adjusted under 35 U.S.C. 154(b) by 26 days.

(21) Appl. No.: 10/189,777

(22) Filed: Jul. 8, 2002

(65) Prior Publication Data

US 2004/0003582 A1 Jan. 8, 2004

(51) Int. Cl.⁷ .................. A01D 45/30; A01G 23/08; A01G 13/02
(52) U.S. Cl. ............ 56/126; 144/335; 47/20.1; 56/328.1
(58) Field of Search ............ 56/126, 328.1, 56/340.1, 327.1; 144/335; 47/20.1, 24.1, 31, 58.1 SE, 58.1 R, 58.1

(56) References Cited

U.S. PATENT DOCUMENTS

| | | | | |
|---|---|---|---|---|
| 3,111,799 A | * | 11/1963 | Schmidt et al. | 56/1 |
| 3,496,705 A | * | 2/1970 | Perrelli | 56/1 |
| 4,422,284 A | * | 12/1983 | Fandrich et al. | 56/328.1 |
| 4,488,396 A | * | 12/1984 | Fandrich | 56/328.1 |
| 5,622,036 A | * | 4/1997 | Hill | 56/12.8 |

FOREIGN PATENT DOCUMENTS

| CH | 1607728 | * 11/1990 | .................. 56/126 |
|---|---|---|---|

OTHER PUBLICATIONS

Brochure: Development and Evaluation of an Ariel Cone Rake, By Dobbs, Silversides, and Walters.*

* cited by examiner

Primary Examiner—Thomas B. Will
Assistant Examiner—Alicia Torres
(74) Attorney, Agent, or Firm—Millen, White, Zelano & Branigan, P.C.

(57) ABSTRACT

A seed harvester pod and method are provided for harvesting seeds from the cones of a live, free—standing, coniferous tree. The pod comprises an open-sided conical frame, open at the top and bottom, supporting a permeable side wall, which may be netting. The netting is operative to allow penetration of sunlight, air and rain. However it will prevent the passage therethrough of airborne seeds released by the cones of the tree. The retained seeds deflect off the netting and drop into an interior, open-topped, annular trough supported by the frame at its base. The seeds are intercepted and collected by the trough. The pod can be lowered by a helicopter line onto the conical upper end of the tree, prior to cone maturation. After the cones have opened and the seeds have matured, released and become airborne, they are contained by the netting, drop and collect in the trough. The harvester is then later retrieved from the tree and the seeds are recovered.

7 Claims, 5 Drawing Sheets

SYSTEM FOR HARVESTING SEED FROM A CONIFEROUS TREE

FIELD OF THE INVENTION

The invention relates to method and apparatus for harvesting seeds from the cones of a coniferous tree.

BACKGROUND

Collection of seeds from the cones of coniferous trees is required for reforestation.

The cones are concentrated in the top third of the trees. These trees can grow to significant heights. For example, white spruce trees grow to a height in the order of 80–150 feet.

The time period for harvesting the seeds is short. Typically, they must be harvested in August within a time frame of about 4 to 14 days.

The most commonly used prior art method known to us, for harvesting coniferous seeds for reforestation, involves:
- felling the tree while the cones are still closed;
- removing the branches carrying the closed cones and transporting them to a central location;
- separating the closed cones from the branches, either manually or with an appropriate machine;
- packing the closed cones into bags and conveying them in refrigerated containers to a separation facility; and
- recovering the seed in a seed extraction plant.

The containers are refrigerated because, if the sun warms the cones, the germination achieved with recovered seed can be deleteriously affected.

In a variation of this system, a helicopter is used to lower a conical harvester over the tip of the tree. The harvester is equipped with a powered rotor having fingers which will sever the branches from the trunk. The branches are recovered into an attached receptacle. The entire assembly is then immediately removed and flown to the central location where the cones are recovered from the branches and processed as previously described.

This prior art system is characterized by several problems or shortcomings. More particularly:
- the seeds tend to have lower germination if picked prematurely. This means that the period of time available for optimum harvesting is narrowly limited, as previously mentioned;
- the process is labor intensive;
- the work to be done is compressed into such a short time period that one has to use several helicopters and crews to harvest seeds from a large number of trees;
- the productivity of a helicopter and its supporting crew at the central location is affected by the number of cones on the trees being harvested; and
- the germination results obtained from seeds recovered in this manner are typically uncertain since the best germination results are obtained when the seeds are fully mature.

SUMMARY OF THE INVENTION

In one aspect of the invention, a seed harvester device is provided. This device is adapted to seat on the conical upper end of a coniferous tree. It is referred to by us as a "pod" and comprises:
- a generally conical, open-bottomed, hollow housing having a permeable side wall, at least partly formed from material, such as mesh or netting, having openings small enough to retain or prevent the passage therethrough of airborne seeds produced by the cones on the tree, but operative to enable penetration therethrough of sunlight, wind and rain;
- the base of the housing internally supports means, preferably forming an open-topped annular trough or receptacle, for intercepting and collecting dropping seeds;
- the housing being connected with means for engaging a retrieval device, such as a cable extending from a helicopter or the hook of a 'cherry picker' machine, so that the pod may be positioned on or retrieved from the tree.

More preferably, the pod comprises:
- an open-sided conical frame, such as one formed by top and bottom rings connected by struts, supporting the netting; and
- a slanted, generally conical, short wall projecting inwardly and upwardly from the bottom ring to form the annular trough for intercepting and collecting downwardly dropping seed.

In another aspect, the invention is concerned with a method comprising:
- harvesting airborne seeds produced by the cones of a coniferous tree, by:
  - providing a pod having an open-bottomed conical housing, adapted to seat on the upper end of the tree, the housing having a permeable side wall operative to retain the seeds when they are airborne while enabling penetration therethrough of natural elements such as wind, rain and sunlight, and first means, carried internally by the housing adjacent its base, for intercepting and collecting dropping seed;
  - positioning the pod over the upper end of the tree at a time prior to when the tree's cones open and the contained seeds mature, release and become airborne;
  - maintaining the pod on the tree as the cones open and the seeds become airborne, so that the seeds are contained by the side wall and drop and are intercepted and collected by the first means; and
  - retrieving the pod from the tree after the seeds have been collected, to recover the seeds therefrom.

The method of the invention is characterized by a number of advantages. More specifically:
- firstly, a multiplicity of pods may be positioned on trees in a sequential manner over an extended period prior to the seed maturing season using a single machine, such as a helicopter or cherry picker. Similarly, the pods can be retrieved over time after the seed maturing season has ended. The time constraint inherent in the prior art process, arising from having to harvest the seeds from a number of trees in a very short time period, has been resolved;
- secondly, our testing has indicated that the germination rate for the fully mature seeds collected in accordance with the invention is higher than that obtained by the previously described prior art technique. More specifically, it appears that seeds that have matured in a cone on the tree and have been collected after the cone opened and they became airborne yielded higher germination than seeds collected in accordance with the described prior art technique; and
- thirdly, the manpower needs for harvesting in accordance with the invention are less than is the case for harvesting in accordance with the described prior art technique.

DESCRIPTION OF THE PREFERRED EMBODIMENT

Figure 1:
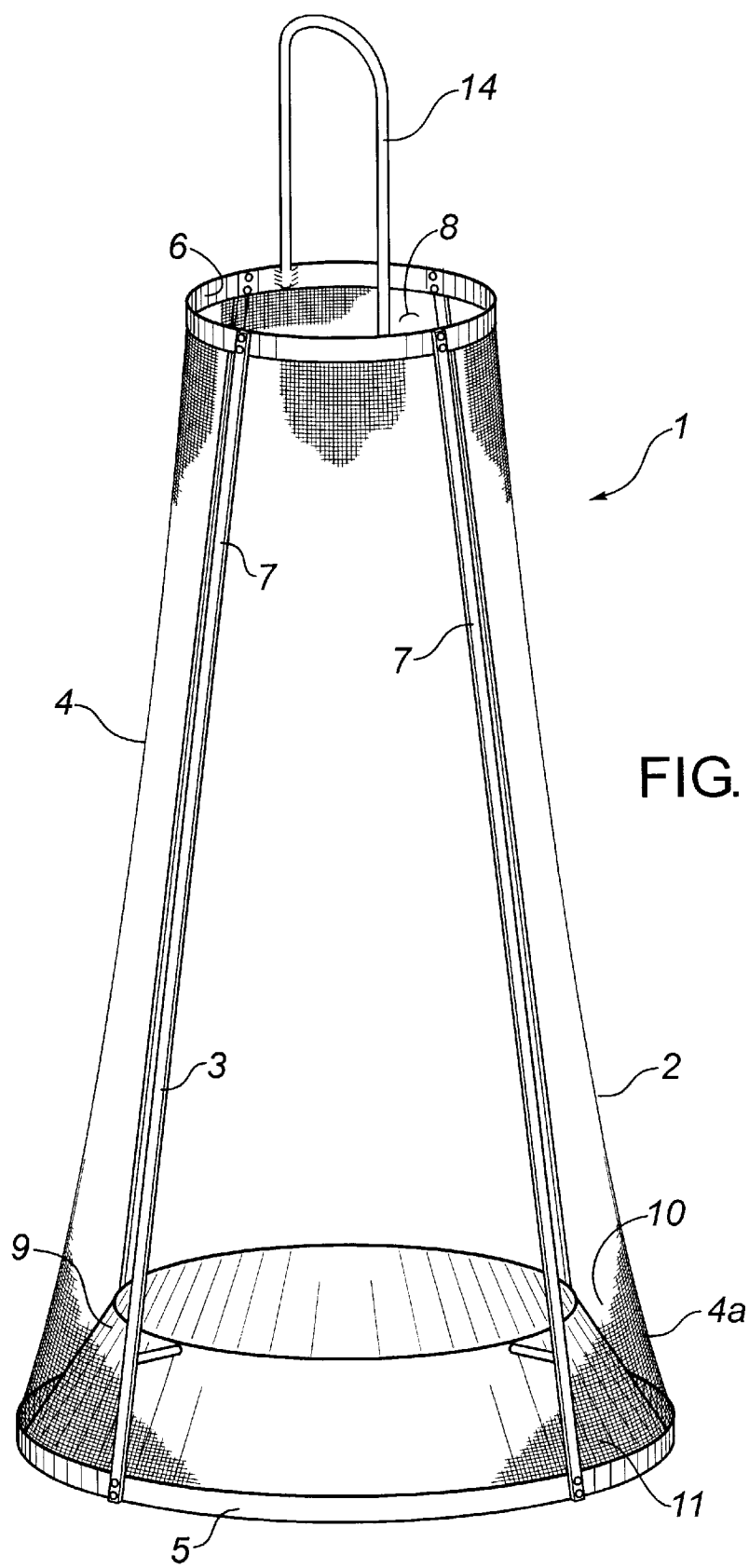
FIG. 1 is a perspective view of a seed collector pod in accordance with the invention.
Figure 2:
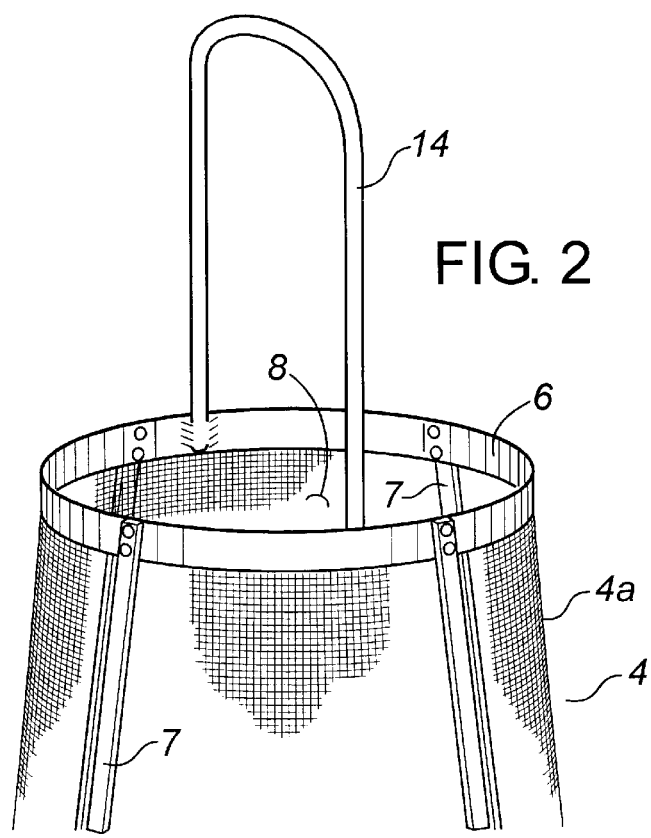
FIG. 2 is an enlarged perspective view of the upper end of the pod of FIG. 1.
Figure 3:
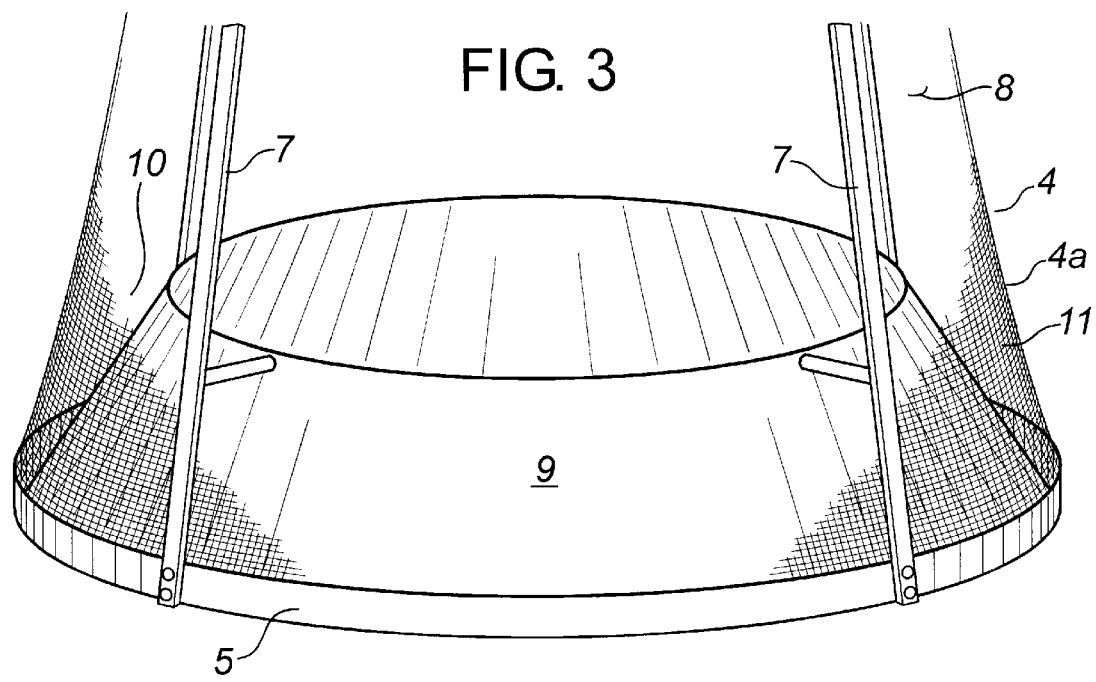
FIG. 3 is an enlarged perspective view of the lower end of the pod of FIG. 1.
Figure 4:
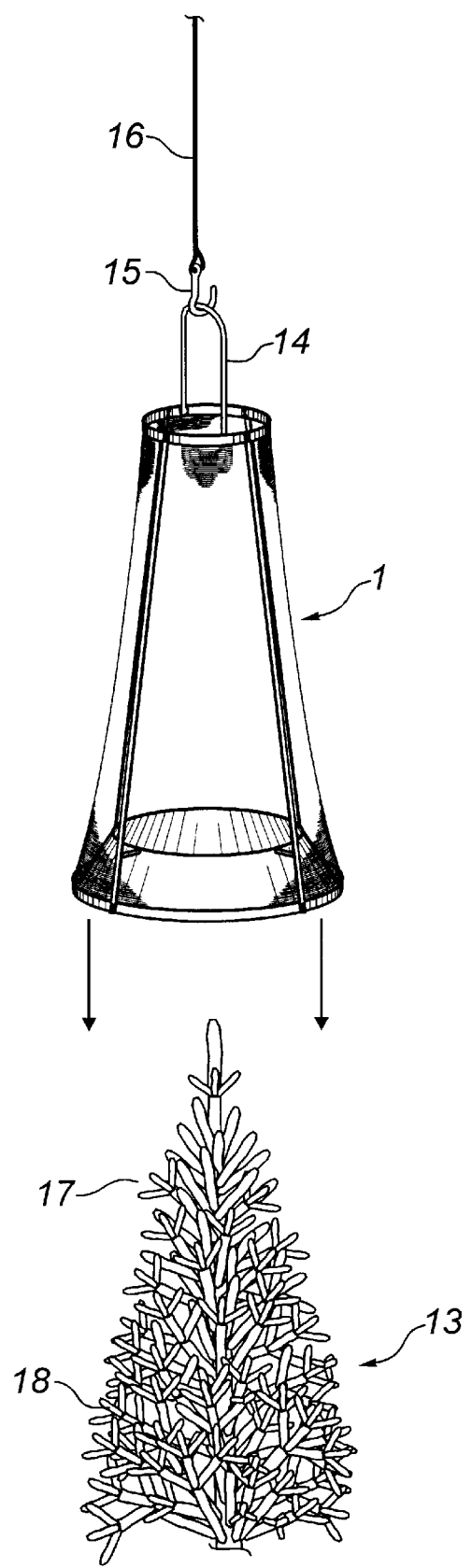
FIG. 4 is a perspective view of a pod being lowered onto a coniferous tree.
Figure 5:
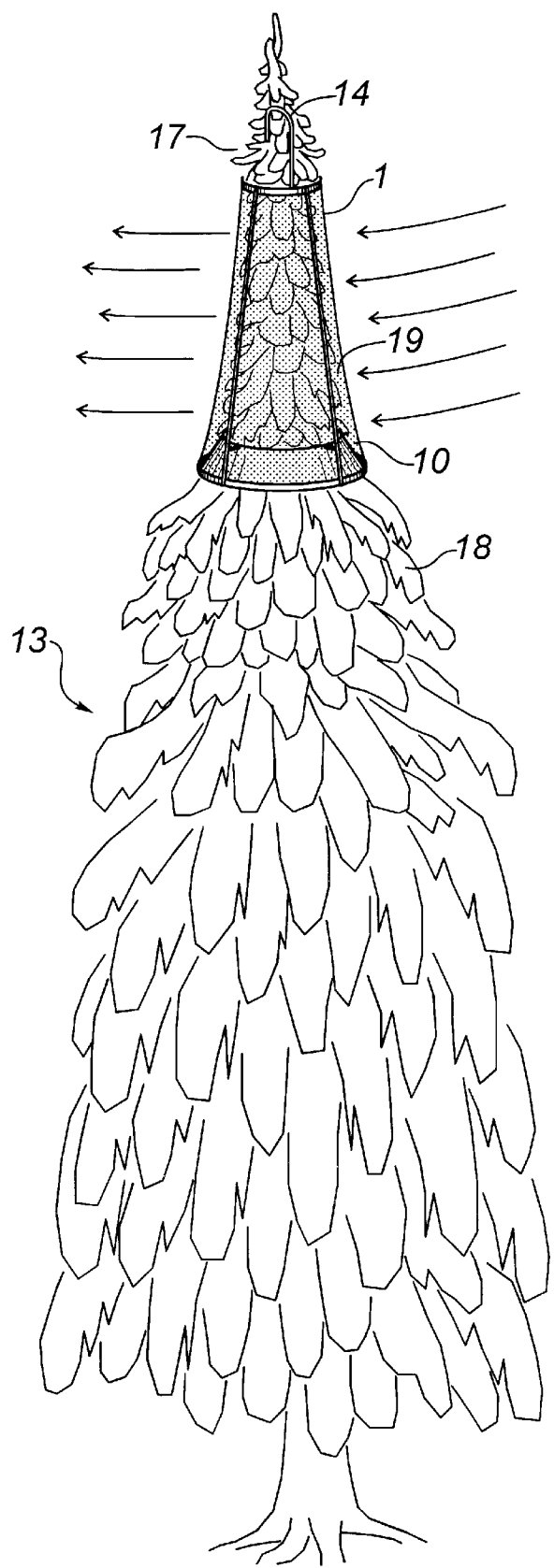
FIG. 5 is a perspective view of a pod in place on a tree, with arrows indicating the flow of air through the pod.

The pod 1 of FIG. 1 comprises a conical housing 2 consisting of an open-sided frame 3 supporting a permeable side wall 4 of netting 4a. The frame 3 comprises a large bottom ring 5 and a smaller top ring 6, joined by circumferentially spaced apart struts 7. The housing 2 forms an internal, conical, open-ended passageway 8.

An inwardly slanted, circular wall 9 extends upwardly from the bottom ring 5. It combines with the netting 4a to form an annular, open-topped trough 10.

The netting 4a forms minute openings 11, sized to prevent the passage therethrough of airborne seeds produced by the cones of a coniferous tree 13. The openings 11 however permit ready penetration therethrough of sunlight, wind and rain. We use the netting or screen used on home screen doors.

A bale 14 extends upwardly from the top ring 6, for engagement with the hook 15 of a retrieval line 16, such as that of a helicopter.

The frame 3 and slanted wall 9 are suitably formed of sheet metal.

In use, the pod 1 is lowered over the upper end 17 of the tree 13. The slanted wall 9 penetrates part way into the foliage 18 of the tree 13 and serves to space the permeable side wall 4 outwardly from the foliage 18, to create an annular space 19. The top ring 6 and slanted wall 9 serve to limit the downward travel of the pod 1 over the tree 13, so that it remains seated on the tree's upper end 17, where the cones are concentrated.

When the pod 1 is in place on the tree 13 and the cones open, the seeds release in due course and become airborne in the prevailing wind moving across the passageway 8. Most of the seeds contact the netting 4a and are deflected. They make their way downwardly through the annular space 19 and are intercepted and collected in the trough 10. Other released seeds drop through the foliage and are intercepted by the wall 9 and are also collected in the trough 10.

The pods 1 can be positioned on trees 13 while the cones are still closed. They remain on the trees while the cones open and the seeds mature, release and become airborne. They can then be retrieved or lifted clear after the seeds have been collected in the troughs 10, leaving the trees intact. This enables flexible scheduling and utilization of helicopters and the like. It also obviates the needs for harvesting branches and separating the cones from the branches.

A test was conducted in which a pod was used as described. The seeds collected were used to raise seedlings. It was determined that the germination rate with these fully matured seeds was superior to that experienced with seeds collected in accordance with the prior art technique.

Figure 6:
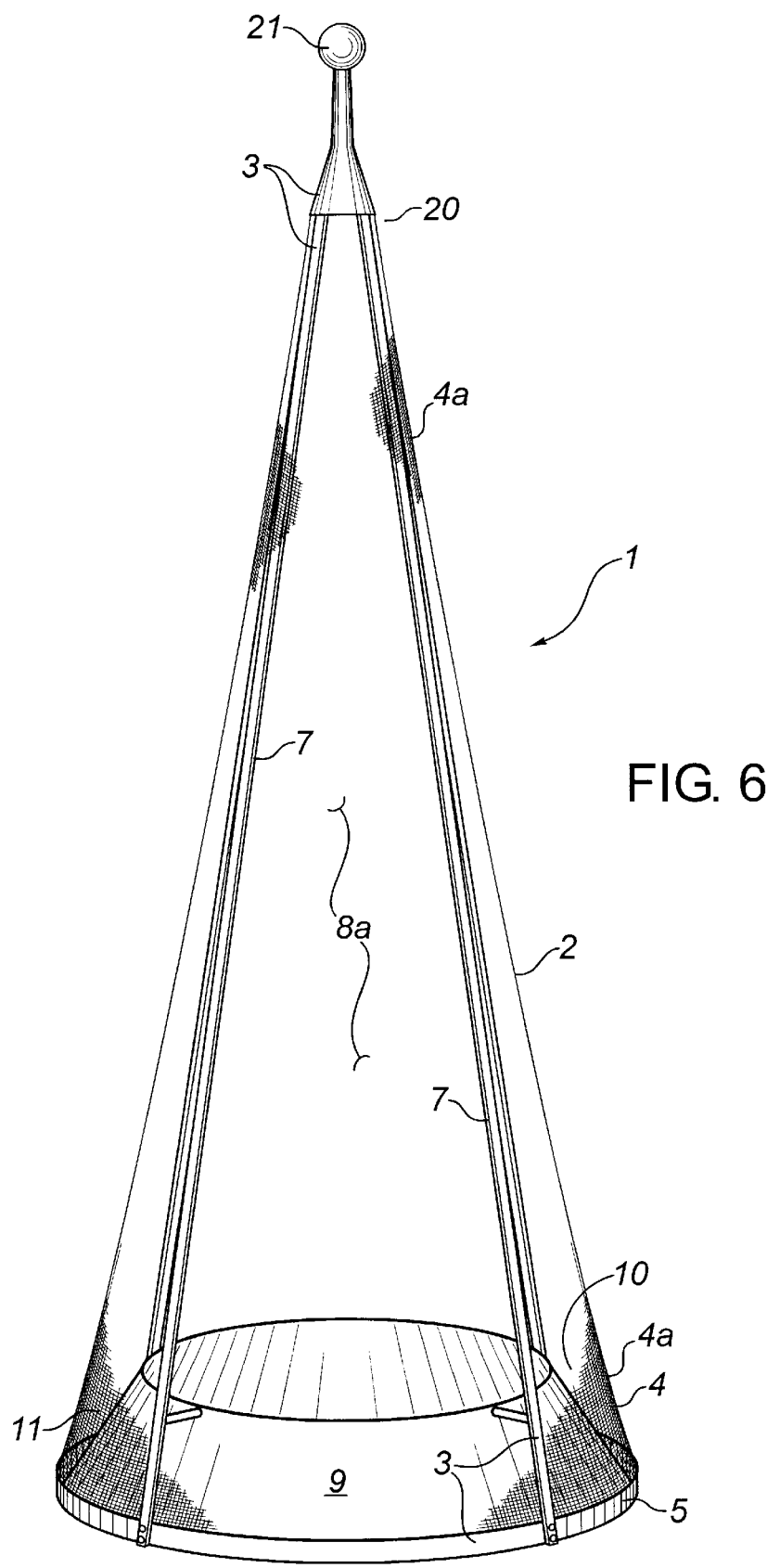
FIG. 6 is a perspective view of an alternative embodiment of the pod, having a ball hitch in place of a bale.

An alternative embodiment of the pod 1 is shown in FIG. 6. The housing 2 is tapered and closed at its upper end 20. A ball hitch 21 is mounted to the end 20, to serve as the retrieval means.

From the foregoing description, one skilled in the art can easily ascertain the essential characteristics of this invention and, without departing from the spirit and scope thereof, can make various changes and modifications of the invention to adapt it to various usages and conditions.

The embodiments of the invention in which an exclusive property or privilege is claimed are defined as follows:

1. A seed harvesting device for recovering mature airborne seeds from the cones of a coniferous tree comprising:

a hollow, open-bottomed, generally conical housing, having a permeable side wall, adapted to seat on the upper end of the tree, the side wall forming openings small enough to retain mature airborne seeds produced by the cones of the tree but operative to enable penetration therethrough of sunlight, wind and rain;

means, supported by the housing internally thereof, for intercepting and collecting said seeds dropping downwardly; and means, connected with the housing, for engagement with a retrieval device to position or remove the housing on or off the tree.

2. The device as set forth in claim 1 wherein:

the side wall is at least partly formed of netting.

3. The device as set forth in claim 2, wherein the means for intercepting and collecting dropping seeds is an annular trough.

4. The device as set forth in claim 3 wherein:

the housing comprises an open-sided conical frame, comprising vertically spaced top and bottom rings and circumferentially spaced apart struts connecting the rings, said frame supporting the permeable side wall; and the trough comprises a slanted, generally conical, short wall projecting inwardly and upwardly from the base of the frame, said wall being operative to engage the tree so as to maintain the side wall in spaced relation whereby an annular space is formed through which seed may drop to reach the trough.

5. A method for harvesting seeds produced by the cones of a coniferous tree, comprising:

providing a pod comprising an open-bottomed conical housing adapted to seat on the upper end of the tree, the housing having a permeable side wall operative forming openings sized to retain the seeds when they are airborne while enabling penetration therethrough of wind, rain and sunlight, and first means, carried internally by the housing adjacent its base, for intercepting and collecting dropping seed;

positioning the pod over the upper end of the tree at a time prior to when the tree's cones open and the contained seeds mature, release and become airborne;

maintaining the pod on the tree as the cones open and the seeds become airborne, so that the seeds are contained by the side wall and drop and are intercepted and collected by the first means; and retrieving the pod from the tree after the seeds have been collected to recover them.

6. A seed harvesting device for recovering mature airborne seeds from the cones of a coniferous tree, said device consisting of:

a hollow, open-bottomed, generally conical housing, having a permeable side wall, adapted to seat on the upper end of the tree, the side wall forming openings small enough to retain mature airborne seeds produced by the cones of the tree but operative to enable penetration therethrough of sunlight, wind and rain;

means, supported by the housing internally thereof, for intercepting and collecting said seeds dropping downwardly; and means, connected with the housing, for engagement with a retrieval device to position or remove the housing on or off the tree.

7. A seed harvesting device for recovering mature airborne seeds from the cones of a coniferous tree comprising:

a hollow, open-bottomed, generally conical housing, having a permeable side wall, adapted to seat on the upper end of the tree, the side wall forming openings small enough to retain mature airborne seeds produced by the cones of the tree but operative to enable penetration therethrough of sunlight, wind and rain;

means, supported by the housing internally thereof, for intercepting and collecting said seed dropping downwardly; said means allowing cones and branches to remain on the tree; and means, connected with the housing, for engagement with a retrieval device to position or remove the housing on or off the tree.

* * * * *